United States Patent [19]
Strefling

[11] Patent Number: 5,453,197
[45] Date of Patent: Sep. 26, 1995

[54] FUEL-WATER CONTAMINANT SEPARATOR

[76] Inventor: Martin P. Strefling, P.O. Box 51, New Troy, Mich. 49119

[21] Appl. No.: 189,879

[22] Filed: Feb. 1, 1994

[51] Int. Cl.⁶ .................................................. B01D 21/24
[52] U.S. Cl. ........................ 210/519; 210/534; 210/539; 210/540
[58] Field of Search .................... 210/513, 519, 210/521, 532.1, 533, 534, 535, 536, 540, 539

[56] References Cited

U.S. PATENT DOCUMENTS

| | | | |
|---|---|---|---|
| 249,487 | 11/1881 | Shetter | 210/532.1 |
| 554,815 | 2/1896 | Field | 210/521 |
| 590,535 | 9/1897 | Arbuckle | 210/521 |
| 717,106 | 12/1902 | Maranville et al. | 210/519 |
| 740,957 | 10/1903 | Warden | 210/536 |
| 826,580 | 7/1906 | Keyes | 210/534 |
| 1,563,247 | 11/1925 | Bruno et al. | 210/534 |
| 2,083,861 | 6/1937 | Padgett | 210/536 |
| 2,624,463 | 1/1953 | Freese | 210/532.1 |
| 2,625,268 | 1/1953 | Hatfield, Jr. | 210/532.1 |

FOREIGN PATENT DOCUMENTS 327454  2/1919  Germany .

Primary Examiner—Christopher Upton
Attorney, Agent, or Firm—Martin P. Strefling

[57] ABSTRACT

A fuel separator designed to separate water and contaminants out of fuel being used in internal combustion engines. Contaminated fuel enters the separator body by inlet port located in the upper portion of the separator body. Having a top, a conical bottom and a sidewall, and having an inlet port for fuel to be purified and an outlet port for purified fuel in an upper portion there of a pipe adjacent said sidewall extending downwardly from said inlet port, to a lower portion of said separator body and having a downward outlet at a lower end.

A deflector body connected to said lower end of said pipe and extending away from said pipe at a downward angle to a C-shaped lip curving downwardly and back towards said pipe which causes the fuel to flow in a rotating motion and subsequently causes a vacuum to be formed at the conical shaped bottom of the separator body. Contaminates and water are sucked to the conical shape bottom of the separator body where they are held motionless and may be release through the bottom screw outlet.

Purified fuel floats to the surface and is drawn into the outlet port, where it will be taken to the carburetor. A top screw outlet makes a complete cleansing of the separator body possible and allows for trapped air to be released.

1 Claim, 3 Drawing Sheets

FUEL-WATER CONTAMINANT SEPARATOR

BACKGROUND OF THE INVENTION

1. Field of the Invention

This invention relates to separating liquid and solid contaminants out of fuels being used by combustion engines.

SUMMARY OF THE INVENTION

The present invention is a single unit intended to separate both liquid and solid contaminants from fuels used by internal combustion engines. These contaminants, which may cause mechanical damage to engines through corrosion and wear, will be removed by this invention. The present invention has several advantages over the prior art inventions:

1. There are no moving parts.
2. There are no parts needing maintenance, periodical cleaning or replacement, making the present invention more cost effective.
3. The simple design allows the separator to be emptied quickly and easily without specialized training or expensive tools.
4. There is a single inverted C-shaped deflector which creates a centrifugal affect and traps contaminants at the very bottom of the separator where they remain motionless, thus allowing purified fuel to fill the purifier and be drawn into the outlet port without any residual contaminants being brought along.
5. There is an ability to use the separator in connection with an internal combustion engine while the engine is running.

It is object of this invention to provide an improved fuel/contaminant separator including an inlet pipe leading to an inverted C-shaped deflector to create a centrifugal action for separating contaminants from fuel and for trapping contaminants at the bottom of said fuel/contaminant separator.

It is another object of this invention to provide a fuel/contaminant separator with a top screw outlet and a cone shaped bottom terminating in a bottom screw outlet to facilitate easy emptying, and if necessary, easy cleaning of said fuel/contaminant separator.

It is another object of this invention to provide a fuel purifier with an outlet port parallel to, but divided from, the inlet port, through which cleaned fuel may be drawn to the carburetor.

It is another object of this invention to provide a fuel purifier including a collection area where liquid and solid contaminants will be caught motionless.

It is another object of this invention to provide a fuel purifier with no moving pans thus rendering the operation simple and efficient and the fuel/contaminant separator primarily maintenance free.

It is another object of this invention to provide a fuel purifier capable of purifying fuel while the engine is in operation.

These and other objects of this invention will be more readily clarified through the following description, illustrations, and claims.

BRIEF DESCRIPTION OF THE DRAWINGS

Similar reference numbers designate corresponding parts throughout the figures.

DESCRIPTION OF THE PREFERRED EMBODIMENTS

Figure 1:
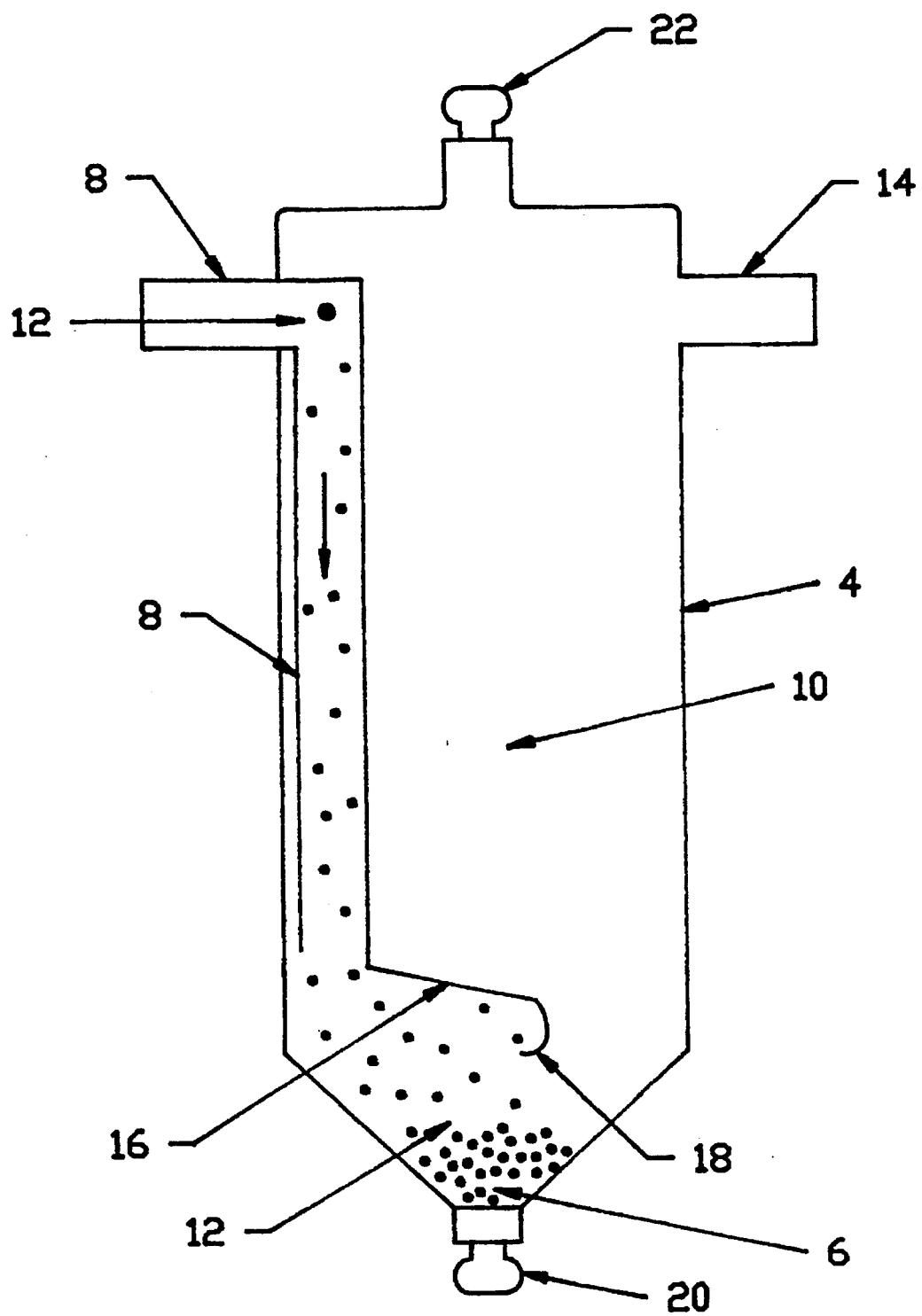
FIG. 1 is a cross-sectional side view of the separator.
Figure 2:
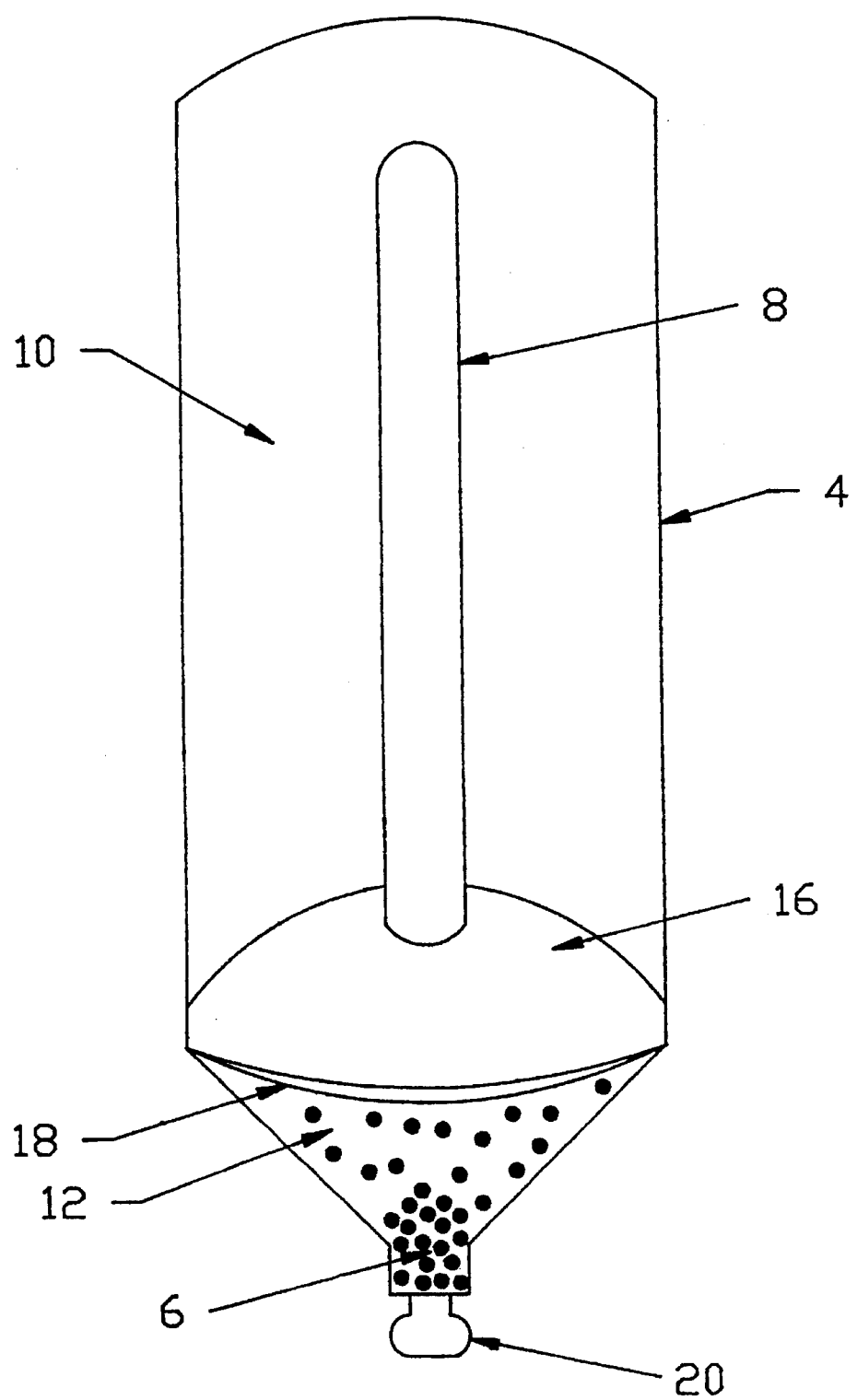
FIG. 2 is a cross-sectional front view of the separator.
Figure 3:
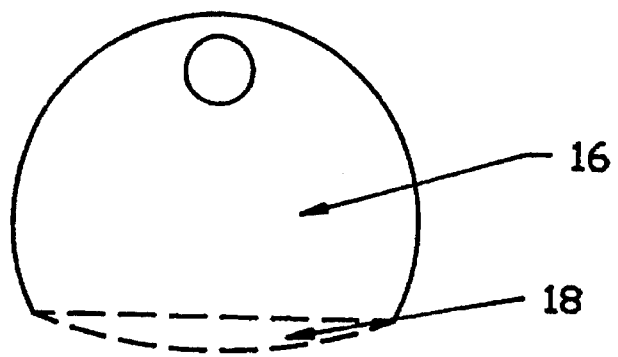
FIG. 3 is a top view of the deflector assembly.
Figure 4:
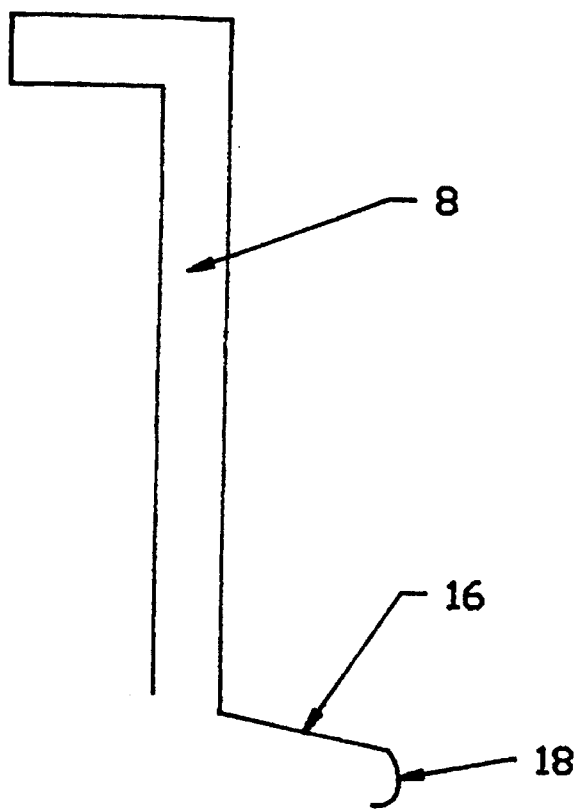
FIG. 4 is a side view of the deflector assembly.

In a preferred embodiment, the separator, as shown in FIGS. 1 and 2, comprises a container (4) having an inlet pipe (8) and an outlet (14) at opposite sides of the upper portion of the container. The inlet pipe extends downwardly adjacent to the sidewall of the container into the lower portion of the container, where it terminates in a deflector body (16). The deflector body, as shown in FIGS. 3 and 4, extends downwardly at an angle away from the inlet pipe to cover approximately three quarters of the area of the lower portion of the separator container. The lower edge of the deflector body adjacent to the uncovered portion has a C-shaped lip (18) curving downwardly and back toward the inlet pipe.

Referring again to FIGS. 1 and 2, below the deflector body, the container has a conical bottom where contaminants accumulate. At the bottom of the cone, there is a screw outlet (20) for removing the contaminants which have settled to the bottom of the separator. The top of the container also has a screw outlet (22) serving as a vent.

In operation, contaminated fuel (12) is admitted into the inlet and flows downwardly into the lower portion of the container. The C-shaped lip on the deflector at the bottom of the inlet causes the contaminated fuel to flow in a spinning motion. The centrifugal effect thus produced causes the contaminants (6) to settle and accumulate in the conical bottom. Purified fuel (10) flows upward past the deflector and lip, into the upper portion of the container, and may be removed from the outlet. The accumulated contaminants may be removed by opening the bottom screw outlet and draining the contaminants, or the entire separator may be cleaned by opening both the top and bottom screw outlets and flushing out the container. The top screw outlet may also be used to vent air trapped in the separator.

While the above describes a preferred embodiment of the invention, it is to be understood that obvious modifications may be made to the structure by those skilled in the art without departing from the scope of the invention.

I claim:

1. An apparatus for separating contaminants from fuel comprising:

a container having a top, a conical bottom and a sidewall, and having an inlet port for fuel to be purified and an outlet port for purified fuel in an upper portion thereof;

a pipe adjacent said sidewall extending downwardly from said inlet port to a lower portion of said container and having a downward outlet at a lower end;

a deflector body connected to said lower end of said pipe and extending away from said pipe at a downward angle to a C-shaped lip curving downwardly and back towards said pipe;

a bottom screw outlet in said conical bottom; and a top screw outlet in said top.

* * * * *